Sept. 20, 1955  R. J. WISE ET AL  2,718,547
FACSIMILE TRANSCEIVERS
Filed May 7, 1951  9 Sheets-Sheet 1

FIG. 1

INVENTORS
R. J. WISE
G. H. RIDINGS
R. D. PARROTT
BY
R. D. Thomas
ATTORNEY

Sept. 20, 1955    R. J. WISE ET AL    2,718,547
FACSIMILE TRANSCEIVERS
Filed May 7, 1951    9 Sheets-Sheet 3

FIG. 3

INVENTORS
R. J. WISE
G. H. RIDINGS
R. D. PARROTT
BY
A. A. Thomas
ATTORNEY

Sept. 20, 1955   R. J. WISE ET AL   2,718,547
FACSIMILE TRANSCEIVERS
Filed May 7, 1951   9 Sheets-Sheet 4

FIG. 4

INVENTORS
R. J. WISE
G. H. RIDINGS
R. D. PARROTT
BY
A. St. Thomas
ATTORNEY

Sept. 20, 1955  R. J. WISE ET AL  2,718,547
FACSIMILE TRANSCEIVERS
Filed May 7, 1951  9 Sheets-Sheet 5

INVENTORS
R. J. WISE
G. H. RIDINGS
R. D. PARROTT
BY
*R. A. Thomas*
ATTORNEY

Sept. 20, 1955  R. J. WISE ET AL  2,718,547
FACSIMILE TRANSCEIVERS

Filed May 7, 1951  9 Sheets-Sheet 6

INVENTORS
R. J. WISE
G. H. RIDINGS
R. D. PARROTT
BY
A. A. Thomas
ATTORNEY

Sept. 20, 1955     R. J. WISE ET AL     2,718,547
FACSIMILE TRANSCEIVERS
Filed May 7, 1951     9 Sheets-Sheet 7

INVENTORS
R. J. WISE
G. H. RIDINGS
R. D. PARROTT
BY
A. A. Thomas
ATTORNEY

Sept. 20, 1955  R. J. WISE ET AL  2,718,547
FACSIMILE TRANSCEIVERS

Filed May 7, 1951  9 Sheets-Sheet 8

INVENTORS
R. J. WISE
G. H. RIDINGS
R. D. PARROTT
BY
ATTORNEY

Sept. 20, 1955  R. J. WISE ET AL  2,718,547
FACSIMILE TRANSCEIVERS
Filed May 7, 1951  9 Sheets-Sheet 9

INVENTORS
R. J. WISE
G. H. RIDINGS
R. D. PARROTT
BY
ATTORNEY

United States Patent Office 2,718,547
Patented Sept. 20, 1955

2,718,547
FACSIMILE TRANSCEIVERS

Raleigh J. Wise, Arlington, N. J., Garvice H. Ridings, Southampton, N. Y., and Robert D. Parrott, West New York, N. J., assignors to The Western Union Telegraph Company, New York, N. Y., a corporation of New York Application May 7, 1951, Serial No. 224,926

17 Claims. (Cl. 178—6.6)

This invention relates to facsimile machines, and its object is to provide a machine adapted to be set up as a transmitter and as a recorder, so that the machine can be connected in a two-way facsimile system either with a main office or directly with a similar machine in a subscriber's office.

The present machine is a compact self-contained apparatus designed to be placed on an office desk or table and powered from an ordinary light socket. The construction of our machine involves various novel features which increase its stability of performance and eliminate certain drawbacks found in prior facsimile transceivers.

Our machine has two scanning mechanisms associated with a single drum, which supports the sheet to be scanned for transmitting as well as recording. The scanning mechanism used for transmitting is of the optical type and the recording is done by an electric stylus. A single casting supports both scanning devices, so that once their component parts are assembled and adjusted, they are mounted as a unit on the base of the machine for easy removal and replacement when necessary.

The recording mechanism has a novel mounting for the stylus, together with novel connections for holding it in operative position. Heretofore it has been the practice to move the stylus against the paper by means of a solenoid, but such devices operate suddenly and the stylus would be thrown into scanning position with a blow that was liable to tear the fast revolving sheet and even injure the stylus point.

We do away with the foregoing objection by providing a stylus support mounted directly on the shaft of a small synchronous motor of the clock type in which the shaft turns at low speed. A spring normally holds the stylus support in withdrawn position. When the motor is energized, it swings the stylus slowly toward the scanning drum, so that the stylus point engages the paper with gradual pressure contact. When the stylus has been moved to scanning position, the energized motor stalls and serves to maintain the stylus in constant pressure with the paper during a recording operation.

Our machine has a rotary scanning drum which is fed forward by a slidable carriage suspended from the drum shaft. This carriage is operated slowly by a simple rack and pinion drive. The pinion is mounted directly on the shaft of a small low-speed synchronous motor, so that no interposed gearing is necessary. The scanning carriage also operates a marker which draws an inked line across the top of the message sheet on the drum as evidence to the patron later on that the message has been transmitted over his machine.

Interlocking push buttons are used for setting the machine up as a transmitter or as a receiver. There are three such buttons, one for sending, one for receiving, and the third is for stopping the machine by releasing either setting-up button. Only one button can be in operated position at a time, for the operation of either setting-up button automatically releases the other. For automatic stopping of the machine at the close of a scanning cycle, whether for transmitting or recording, we provide a connection operated by the scanning carriage at the end of its travel to release the operated setting-up button.

The novel features and practical advantages of our facsimile transceiver will be understood from a description of the accompanying drawings in which.

The base or chassis B of the machine is a shallow metal box which carries inside and outside the entire equipment necessary for the operation of the transceiver, such as a transmitting amplifier, a recording amplifier, and all other parts required for connecting the machine in the system. However, this electric equipment is not shown and will not be described, for this invention concerns the machine itself as a piece of apparatus aside from the system in which it is commercially used. As indicating the compactness of this transceiver for office use, it may be mentioned that the base B need not be over twelve inches square.

Figure 14:
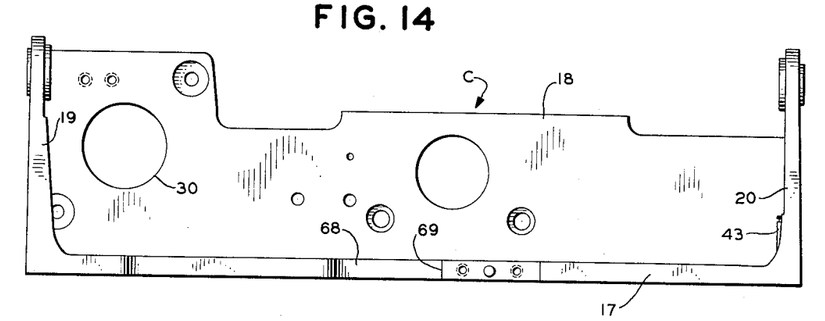
Figure 15:
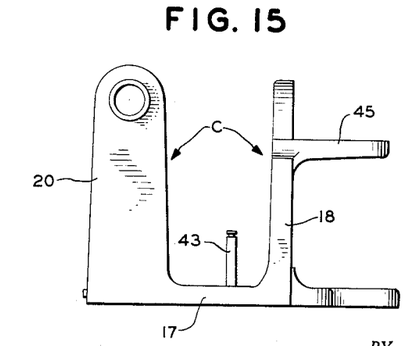

A heavy one-piece casting C, usually of aluminum, supports both scanning mechanisms, and this casting is fastened to the base in any practical way, as by screws 15 which pass upward from inside the base into the casting. We may interpose rubber cushions 16 on which the casting rests and which act as shock absorbers, thereby protecting the scanning elements against undue vibration. The structure of casting C, as clearly shown in Figs. 13, 14 and 15, comprises a bottom plate 17, a vertical back plate 18, and two upright sides or brackets 19 and 20.

Figure 3:
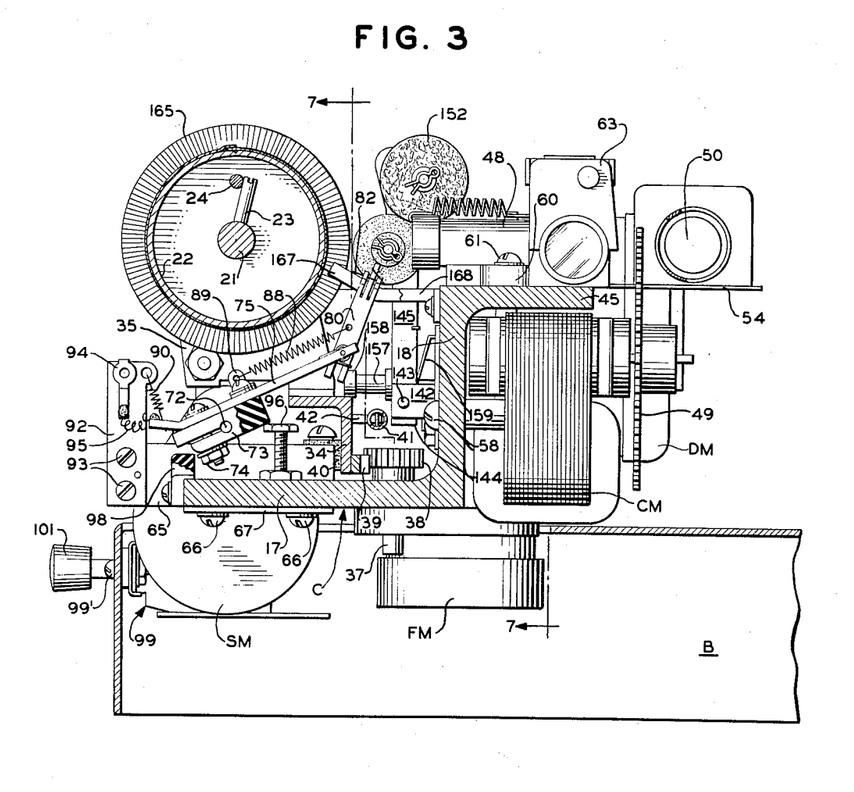
Fig. 3 is a cross-section on line 3—3 of Fig. 2, looking toward the left.
Figure 7:
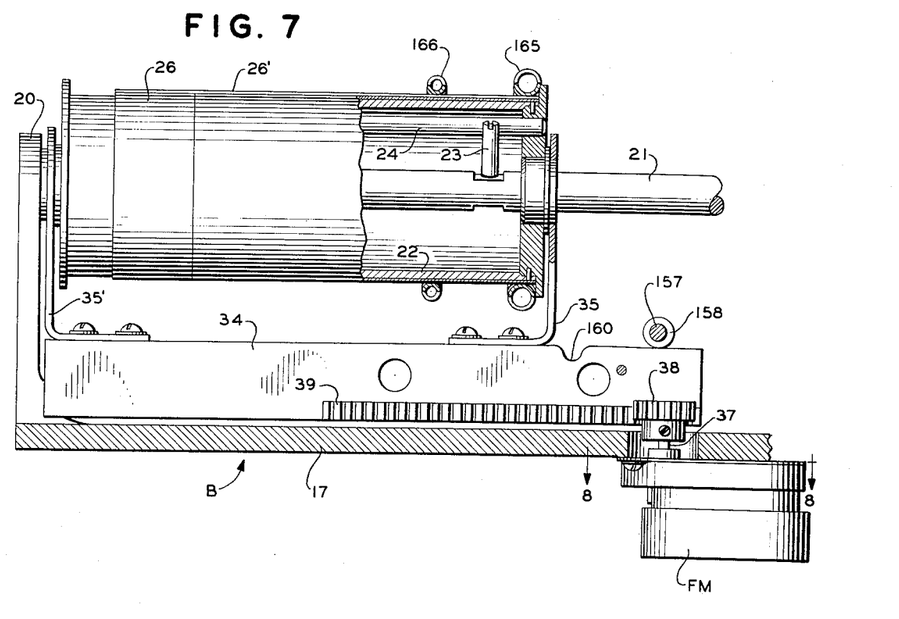
Fig. 7 is a longitudinal section on line 7—7 of Fig. 3.
Figure 9:
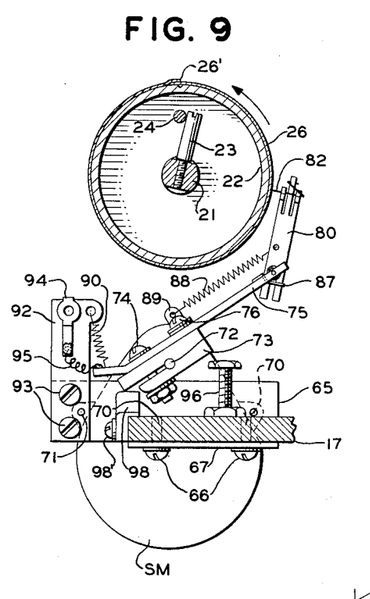
Fig. 9 shows a side view of the stylus mounting in scanning position.

The brackets 19 and 20 have bearings for rotatably supporting a shaft 21 on which a metal scanning drum 22 is slidably mounted. The drum is free to turn on the shaft for approximately one revolution and is connected thereto by a radial pin 23 screwed into the shaft inside the drum (Figs. 3, 7 and 9). A rod 24 is supported inside the drum by the end disks 25 parallel to the shaft 21. When the pin 23 strikes the rod 24, the drum becomes coupled to the shaft for rotation at scanning speed.

Figure 1:
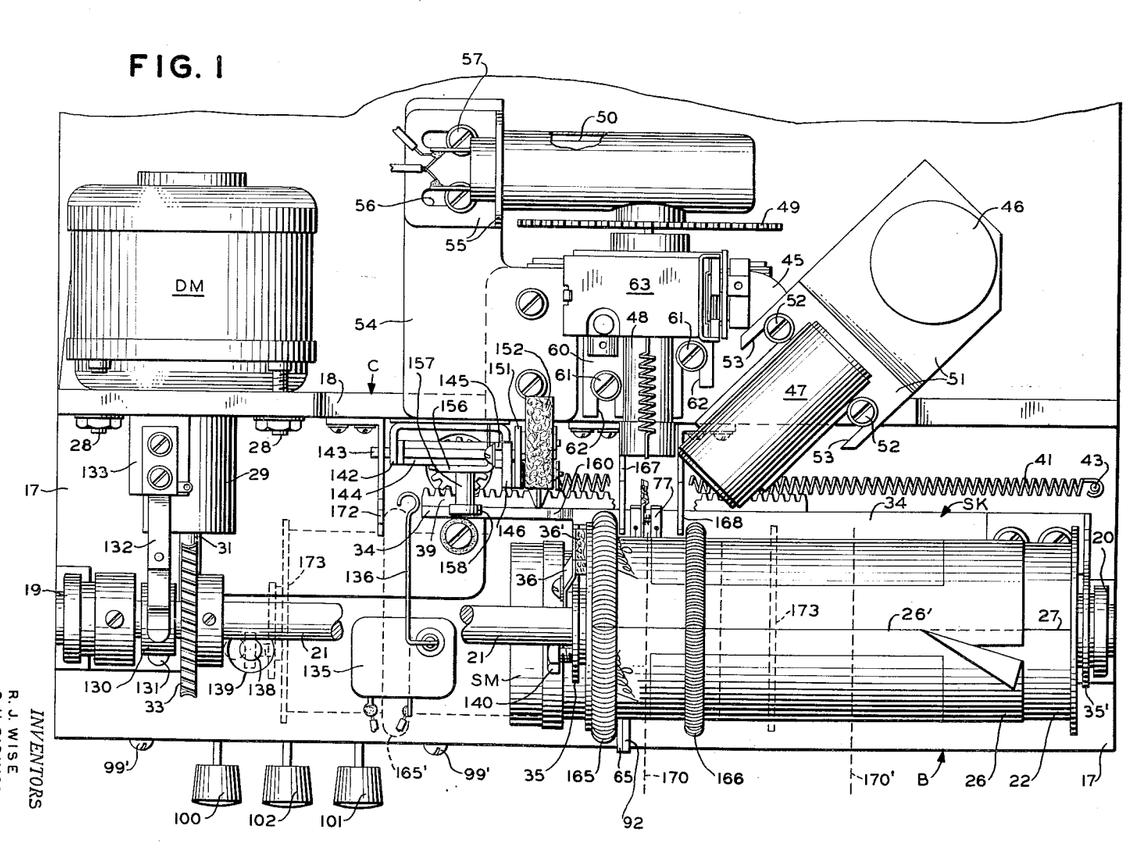
Fig. 1 represents a plan view of a machine.

The reason why the drum is free to rotate on shaft 21 for almost a full turn is to permit a rotary adjustment of the drum by the operator for easier mounting of a blank 26 in proper position. As shown in Fig. 1, the outer or lapped-over edge 26' of the wrapped sheet should coincide with a longitudinal guide line 27 on the drum. In practice, the line 27 is a groove filled with a permanent color, preferably a bright red or orange. When we refer to the sheet 26 as a blank, we include a message copy for transmission and a blank for recording, both being the same size.

The drum shaft 21 is driven by a synchronous motor

Figure 2:
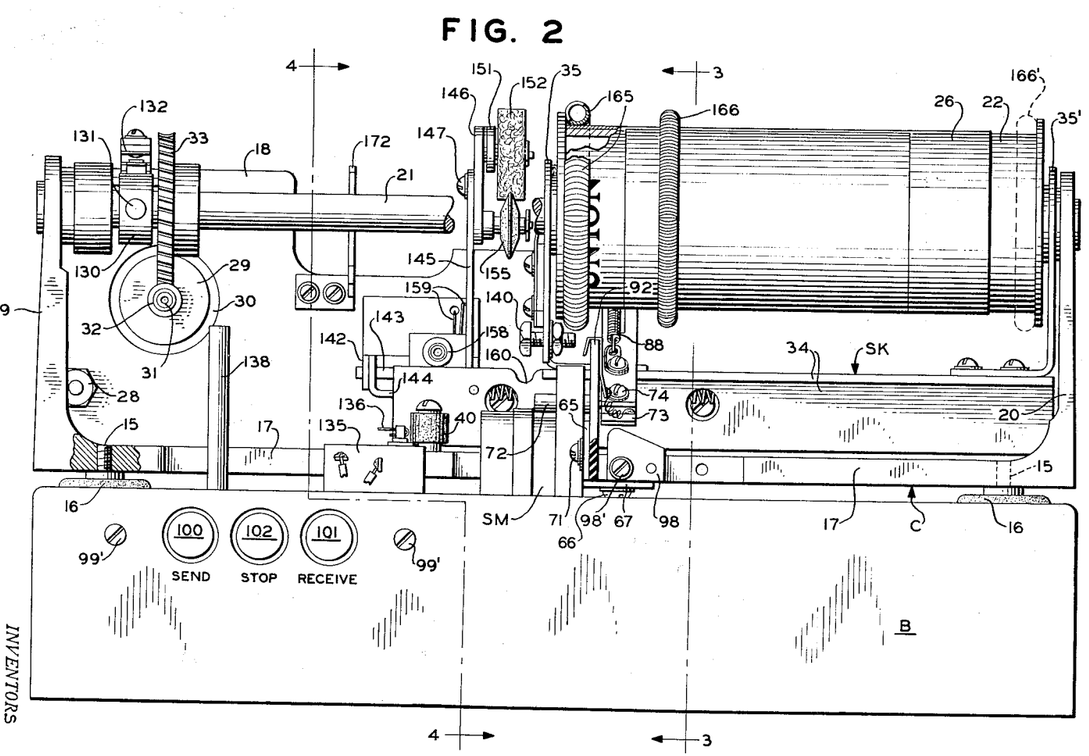
Fig. 2 shows a front view.

DM mounted on the rear side of the vertical wall 18 of casting C by bolts 28 (Figs. 1 and 2). The motor housing has a bearing extension 29 which projects forward through an opening 30 in the wall 18 for supporting the long shaft 31 of the motor. A worm 32 on the motor shaft 31 meshes with a worm gear 33 fixed on the drum shaft 21, whereby the latter is rotated at high speed (for example, 180 R. P. M.) during a scanning operation. For distinction we call DM the drum motor.

The rotation of drum 22 is accompanied by a slow feeding of the drum along the shaft 21. This feeding operation is done by a slidable carriage SK, which is a U-shaped frame comprising a horizontal angle bar 34 and a pair of upright side arms 35 and 35', as best shown in Figs. 2 and 7. The arms 35—35' embrace the drum 22 at its ends and have openings for the shaft 21, so that the carriage SK is slidably suspended from the drum shaft. The drum has no axial play between the arms 35—35' which push the revolving drum along the shaft without interfering with its rotation. A spring arm 36 (Fig. 4) secured to the arm 35 carries a suitable friction pad 36' which presses constantly against the adjacent drum disk to act as a brake or load for holding the drum firmly coupled to the shaft 21.

Figure 8:
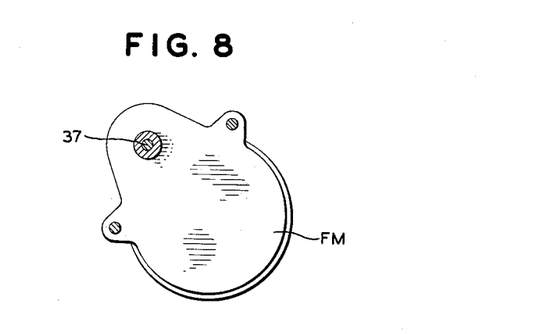
Fig. 8 is a section on line 8—8 of Fig. 7.

The scanning carriage SK is operated by a small synchronous clock motor FM which we name the feed motor. This motor is located in the chamber of the hollow base B (Fig. 3) and is screwed to the underside of the casting base 17 (Fig. 8). The vertical drive shaft 37 of motor FM projects through an opening in the base plate 17 and its upper end carries a pinion 38. A rack bar 39 secured to the vertical face of the angle bar 34 is always in mesh with the pinion 38, whereby the motor FM feeds the carriage SK forward at the required low speed. A roller 40 of fiber or the like is arranged opposite the pinion 38 and serves as a guide for the scanning carriage, which travels in a straight line parallel to the drum shaft.

It should be noted (see Figs. 2 and 3) that the angle bar 34 of carriage SK is slightly spaced from the bottom plate 17 of the casting, due to the carriage being suspended from the drum shaft 21, whereby the carriage slides along smoothly with little friction. A long contractile spring 41, fastened at one end to the pin 42 and at the other end to pin 43 on base plate 17, returns the carriage SK and therefore the drum 22 to normal position when the feed motor FM is deenergized.

The rack and pinion drive 38—39 for the scanning carriage SK has the important practical advantage of simplicity, compactness and low cost over the old half-nut and screw shaft drive in prior facsimile machines. As is well known, the use of a half-nut required an extra device to move it into and out of engagement with the motor driven screw shaft which was connected to the drum shaft through elaborate gearing for the required speed reduction.

On the other hand, the gear connection 38—39 in the present machine is permanent and therefore requires no control means like the old half-nut. Further, the pinion 38 is mounted directly on the projecting shaft 37 of the low speed motor FM, so that no extra speed reducing gears are necessary. This motor, a well known article in the market, allows the carriage SK and drum 22 to be pulled back instantly by the spring 41, because there is no appreciable opposition to the reverse rotation of the pinion 38.

*The optical scanning mechanism*

The vertical back plate 17 of casting C has a horizontal rear extension 45 which serves as a platform for supporting all the optical parts of the scanning mechanism used in transmission. Some of the parts are of standard construction and require no detailed description, such as an exciter lamp 46, a condenser lens tube 47, a pickup lens tube 48, a light chopper disk 49, and a photocell 50. It will be understood that these optical elements are so arranged that a beam of light from the lamp 46 is focused by the condenser tube 47 as a scanning spot on the mounted sheet 26, and from there the light is deflected to the pickup tube 48, reaching the photocell 50 through the chopper disk 49.

While the parts 46 to 50 are, broadly speaking, conventional elements common in optical scanners of facsimile machines, we have provided novel means for mounting those parts to form a compact unit easily assembled and adjusted.

The exciter lamp 46 and condenser tube 47 are mounted on a sheet metal bracket 51 which is fixed on the platform 45 by screws 52. These screws pass through slots 53 in the bracket to permit axial adjustment of the optical elements 46—47 as a unit for focusing the scanning beam on the drum 22. The platform 45 of casting C also carries an L-shaped plate 54 which extends rearward and supports the photocell 50 in operative relation to the pickup tube 48 and the chopper disk 49. The casing of photocell 50 has an angle bracket 55 which has slots 56 for receiving screws 57 whereby the photocell is axially adjustable to correct position.

The chopper disk 49 is driven by a synchronous motor CM which is secured to the rear wall 18 beneath the platform 45 by screws 58 (Fig. 3). In the present machine, the pickup tube 48 is fixed on a plate 60 mounted on the platform 45 and fastened by screws 61, which pass through slots 62 for axial adjustment of the pickup tube. The plate 60 also supports a small casing 63 which provides a light-proof chamber through which the scanning beam passes from the pickup tube 48 past the chopper disk 49 to the photocell 50.

*The stylus recording mechanism*

In the description of this mechanism, we shall refer mostly to Figs. 3 and 9 which show the stylus operating connections in normal withdrawn position (Fig. 3) and in recording position (Fig. 9).

Figure 13:
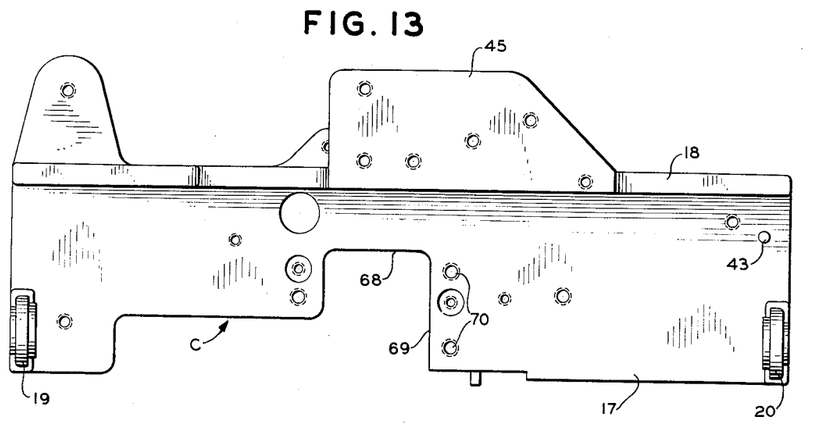
Figs. 13, 14 and 15 show the main casting of the machine in plan, front and end views, respectively.

An upstanding angle bracket 65 is secured to the base 17 of casting C by screws 66 which pass through the horizontal bottom flange 67 of the bracket. As shown in Fig. 13, the casting base 17 is cut away at 68 to provide an edge 69 against which the bracket 65 abuts. The screws 66 pass through holes 70 in the casting. A small clock type synchronous motor SM is fastened to the bracket 65 by screws 71 (Fig. 2) with its short driving shaft 72 in horizontal position. In this case, the gearing inside the motor casing is such that the shaft 72 makes one revolution per minute, but we mention this merely by way of example.

A split block 73 of insulating material is rigidly clamped to the motor shaft 72 by a screw 74, and a conducting arm 75 is mounted on the block by a screw 76 and also by the clamping screw 74. The arm 75 extends rearward in a plane normal to the drum shaft 21 and the rear end 77 of this arm is bifurcated, as shown in the enlarged fragmentary views in Figs. 10 and 11. The forked end 77 carries a pin 78 on which is pivoted a strip 80 of spring metal (like Phosphor bronze) for supporting a stylus 82.

Figure 10:
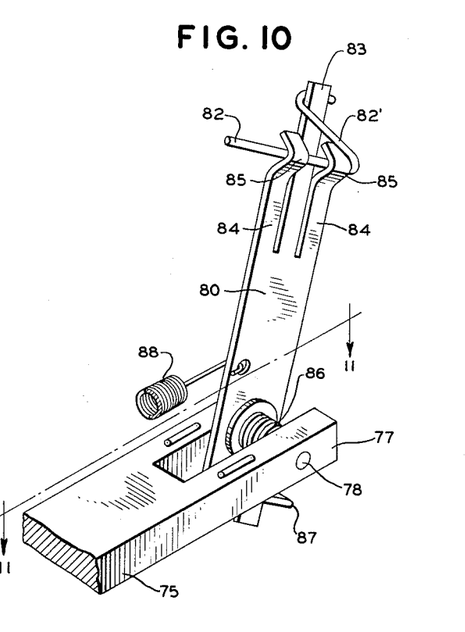
Fig. 10 is an enlarged perspective of a portion of the stylus support.
Figure 11:
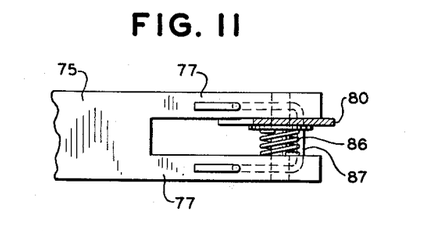
Fig. 11 is a section on line 11—11 of Fig. 10.
Figure 12:
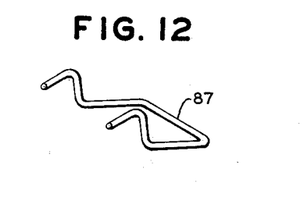
Fig. 12 shows a spring stop used in the stylus mounting.

As clearly shown in Fig. 10, the stylus holder 80 is formed at its free end with a central prong 83 and a pair of side prongs 84 which have bent tips or offsets 85. The stylus 82 is a piece of steel or tungsten wire so shaped as to have a front straight portion which is clamped between the central prong 83 and the offsets of the side prongs 84, while the rear extension 82' of the wire is hooked around the projecting tip of the central prong. In this way, the stylus wire is rigidly mounted on the holder 80 by the spring pressure of the three prongs 83 and 84 without the need of separate fastening means. The hook end 83' of the wire locks the stylus against axial displacement. Further, this novel stylus clip permits easy insertion and removal of the stylus.

The stylus holder 80 is held against side play on the pivot pin 78 by an expanding coil spring 86. A U-shaped wire spring 87 carried by the forked end 77 of arm 75 acts as a resilient cushioning stop to limit the forward swing (leftwise in Fig. 9) of the stylus holder 80 under the pulling action of a spring 88 which is attached at one end to the holder and at the other end to a lug 89 on the arm 75. It is clear that the spring 88 holds the connected members 75 and 80 out of line, so that they constitute a toggle joint.

A contractile spring 90 is connected to a forward extension of arm 75 and constantly tends to rock the arm downward (clockwise as viewed in Figs. 3 and 9). The upper end of spring 90 is attached to an upright insulating strip 92 which is mounted on the front end of the bracket 65 by screws 93. The strip 92 is also used as an insulator for a metal terminal 94 to which the stylus 82 is electrically connected by a flexible conductor 95 and the metallic supporting members 75 and 80.

Normally the spring 90 holds the stylus support in withdrawn position, as shown in Fig. 3, with the insulating block 73 engaging a stop 96 which in the present machine is an adjustable screw let into the casting base 17. While the spring 88 tends to rock the pivoted holder 80 toward the drum, the resilient stop 87 limits this forward movement of the holder to keep the stylus 82 at the proper distance from the drum. In its retracted position, the recording stylus 82 does not interfere with the operation of the machine as a transmitter.

When the motor SM is energized for a recording operation, the motor shaft 72 swings the toggle jointed members 75 and 80 upward very slowly until the block 73 strikes an insulating stop 98 which is attached to the front edge of base plate 17 by a screw 98'. However, shortly before the block 73 encounters the fixed stop 98 the stylus 82 engages the blank 26, so that the continued upward movement of the arm 75 to final position causes the holder 80 to rock about its pivot 78 until the block 73 hits the stop 98. At that moment, the energized motor SM stalls and continues to exert a torque on the arm 75, thereby maintaining the stylus point in constant pressure contact with the surface of the scanned sheet. This stylus pressure is determined by the strength of the tensioned spring 88 and is very small.

Let it be noted that the motor SM is kept energized during the entire recording operation, so that the shaft 72 constantly tends to turn forward (leftwise as viewed in Fig. 9), thereby holding the block 73 firmly against the stop 98. This keeps the spring 88 under tension to hold the stylus point against the paper with a uniform recording pressure. Owing to the slow turning of the motor shaft 72 (anywhere from one to about ten R. P. M.), the stylus 82 is brought into contact with the paper with a gentle motion, so that no injury can happen to the paper by the stylus point. When the motor SM is deenergized, the tensioned spring 90 instantly rocks the stylus mounting (block 73, arm 75 and holder 80) downward as a unit until the block 73 strikes the stop 96 (Fig. 3).

Broadly considered, the stylus operating mechanism of our transceiver utilizes the torque of the stalled motor SM to hold the stylus in scanning contact with the sheet on the rotating drum. We regard this feature as one of basic novelty and claim it as such.

*The setting-up switches (Figs. 16 and 17)*

The machine is manually set up for either operation (transmitting or recording) by a switching unit 99 which is mounted by screws 99' (Fig. 2) in the hollow base B at the front of the machine. This selective switch unit is operated by a send button 100, a receive button 101 and a stop button 102. These three buttons are so interconnected that only one setting up button can remain operated at one time, and the stop button 102 releases either one of the other buttons from operated position. This will be understood from Fig. 16, which shows a simple form of interlocking switch suitable for this machine.

Figure 16:
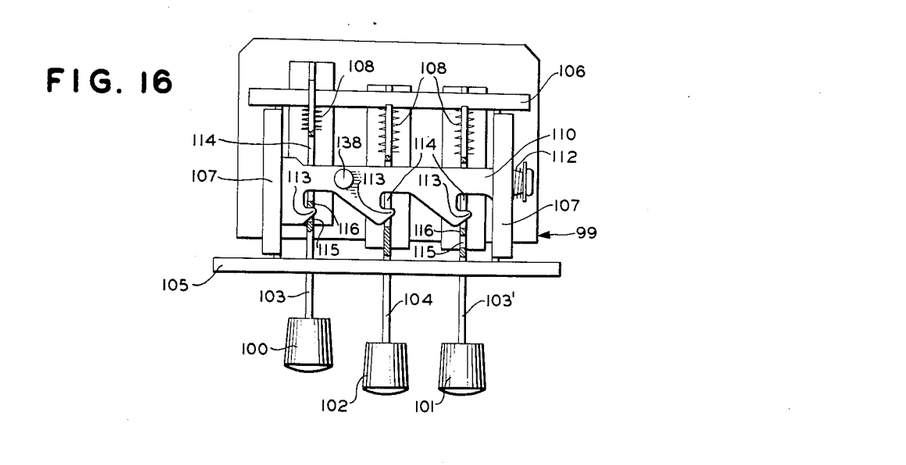
Fig. 16 is a plan view of a form of three-button interlocking switch used in the machine.

Each button 100—101 operates a slidable bar 103, and since these bars are alike, it will be sufficient to describe but one of them, except that for distinction we shall identify the bar of receive button 101 by the character 103'. The central stop button 102 operates a slidable bar 104 which is somewhat different from the bars 103—103'. These three bars are slidably mounted on a rectangular frame which comprises a front plate 105, a rear plate 106 and two side plates 107. An expanding coil spring 108 normally holds each bar pushed forward in open circuit position.

A cross plate 110 is slidably supported by the side plates 107 and an expanding coil spring 112 normally holds the cross plate to the right. The cross plate 110 is formed with three cam teeth 113, each arranged to enter a slot 114 in the adjacent bar 103—103'—104, when the corresponding buttons 100—101—102 are in normal position. The bars 103 and 103' of the two setting up buttons 100 and 101 have each a short slot 115, but the bar 104 of the stop button has no such slot. The slots 114 and 115 of each bar are separated by a shoulder 116 arranged to engage the associated cam tooth 113.

It is clear from Fig. 16 that when either button 100 or 101 is pushed in, the shoulder 116 cams the associated tooth 113 out of the way, thereby moving the cross plate 110 to the left. When the continued inward movement of the button brings the short slot 115 in line with the cam tooth 113, the latter snaps into the slot and locks the operated switch bar (103 or 103') against return. Fig. 16 shows the send button 100 locked in pushed-in or circuit-closing position. The switches controlled by each setting up button 100—101 will be presently described.

Looking at Fig. 16, it will be seen that if the receive button 101 should be pushed in, the cross plate 110 will be cammed aside and release the send button 100 before the other button reaches its final position. When the stop button 102 is operated, the cross plate 110 is pushed to the left to release the operated setting up button, but the stop button itself instantly returns to normal position when released by the fingers. This is due to the fact that the bar 104 has no locking shoulder to engage the associated cam tooth 113.

While it would be possible for a person in a playful or inquisitive mood to push in both buttons 100—101 at the same time, so that both setting-up switches would stay locked in circuit closing position, the control circuits of the machine when connected in the system are such that nothing would happen under those conditions. That safety feature is not a part of the present invention and therefore in describing the circuits of Fig. 17 we may properly assume that only one setting-up switch can be in operated position at one time.

Figure 17:
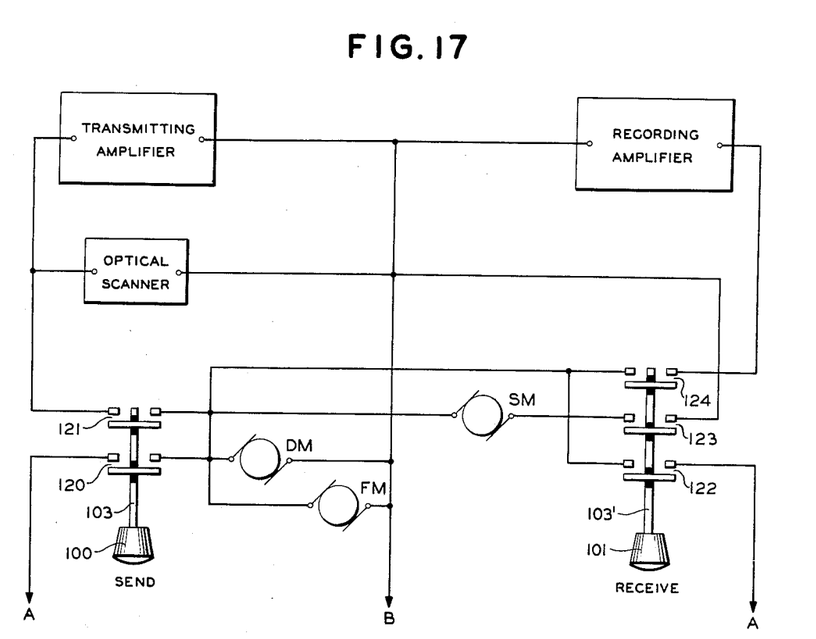
Fig. 17 shows the setting up circuits controlled by the switch.

The source of power for the machine is indicated in Fig. 17 by a pair of leads A—B plugged into a convenient electric socket in the room where the machine is located. The conductor A is shown at both sides of the diagram to prevent crossing of circuit lines. The send button 100 controls two switches 120 and 121, each of which is represented diagrammatically by a pair of contacts and a connecting piece. The receive button 101 controls three switches 122—123—124. All the switches 120 to 124 are normally open.

The circuits of Fig. 17 will be understood without detailed tracing of connections. When the send button 100 is operated, the drum motor DM, the feed motor FM are energized to rotate the drum and to operate the scanning carriage SK for feeding the drum axially along its shaft. At the same time, the transmitting amplifier and the optical scanning mechanism are energized. However, the circuits of the stylus motor SM and the recording amplifier remain open because the recording switches 123 and 124 are not closed.

On the other hand, when the receive button 101 is operated in response to a calling signal, the closed switches 122—123—124 cause the three motors SM, DM and FM and the recording amplifier to be energized, while the circuits of the transmitting amplifier and the optical scanning mechanism remain open.

It is thus clear that the transmitting amplifier and the optical scanner are energized only when the send button 100 is operated, while the recording amplifier and the stylus motor SM are energized only when the receive button 101 is pushed in. However, the drum rotating motor DM and the drum feeding motor FM are operated when either button 100 or 101 is pressed. This is as it should be, for the rotation and feeding of the drum are necessary for transmitting as well as for recording.

Those familiar with facsimile work will understand that the circuits in Fig. 17 have been simplified down to the bare essentials for the purpose of this description. In the commercial system using these transceivers there are various controls for causing certain parts to start in predetermined time sequence so that the connected machines operate in phase relationship. The phasing circuits are controlled by a commutator 130 on the drum shaft 21, as shown in Figs. 1 and 2. In the present machine this commutator is simply a collar with a knob or projection 131 which briefly closes (or opens, in some machines) a switch 132 once for each revolution of the drum. The switch 132 is mounted on a small angle bracket 133 attached to the back wall 18 of casing C. The circuits controlled by this switch do not belong in this case and require no further mention.

*Special features associated with the scanning carriage SK*

The sliding movement of the scanning carriage SK is utilized to operate a switch 135 (Fig. 1) soon after the scanning has begun. The switch 135 is normally open and is closed by means of a long flexible wire arm 136 arranged outside the switch casing so as to project into the path of the angle bar 34 of carriage SK. Although the wire arm 136 is actuated as soon as the carriage starts moving, the switch contacts controlled by that arm are not closed until the carriage has moved a short distance. The switch 135 is held closed by the carriage bar 34 during the entire scanning operation and opens automatically when the carriage returns to normal position.

The function of switch 135 is to provide a circuit which forms a part of the system in which this machine is connected. Since that system is the subject of a separate application, the circuit controlled by switch 135 will not be described here, but the mechanical control of the switch by the scanning carriage is a feature of the present invention.

The scanning carriage SK also controls the setting-up switch 99 of Fig. 16 at the end of a scanning operation. For this purpose the cross plate 110 is provided with an upstanding pin 138 which projects through an opening 139 (Fig. 1) in the top of base B. The side plate 35 of the scanning carriage has an adjustable bolt 140 (Fig. 2) which strikes the pin 138 as the carriage reaches the end of its forward travel. As seen from Fig. 16, a slight movement of the cam plate 110 to the left will instantly release the operated button 100 or 101 to shut the power off the machine. In other words, the machine automatically shuts down at the close of a transmitting or recording operation.

When a patron handles a number of messages for transmission on his machine, a question may arise in his mind later whether this or that message had been facsimiled to the connected recorder which may be at the main telegraph office or in the office of another patron. To identify a message as one having been transmitted, we provide automatic message marking means controlled by the scanning carriage SK.

Figure 4:
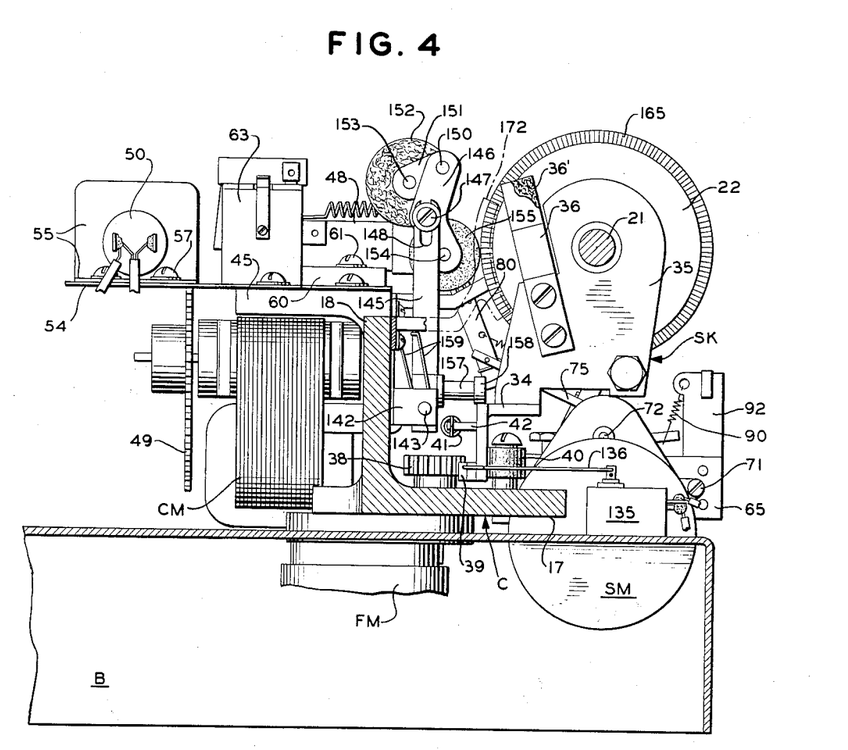
Fig. 4 shows a section on line 4—4 of Fig. 2, looking toward the right.

Referring to Figs. 1 to 6, a small U-shaped bracket 142 is fixed on the back plate 18 and carries a pin 143 on which is swiveled a U-shaped frame 144. One end of this frame extends upward to form an arm 145 which carries at its upper end a holder 146 (Fig. 4). This holder is a V-shaped or angular piece attached at the middle to the arm 145 by a screw 147 which passes through a slot 148 in the arm. This slotted mounting permits adjustment of the holder 146 lengthwise of the arm as well as rotatably thereon. Once adjusted, the holder 146 is secured rigidly to the arm.

The holder 146 has at its upper end a pin 150 (Fig. 4) for pivotally mounting a short link or arm 151 which carries a felt inking roller 152 on a pin 153. The lower end of holder 146 carries a pin 154 which supports a marking wheel 155 arranged in contact with the inking roller 152. The roller 152 thus hangs by gravity against the periphery of wheel 155, whereby the rotation of the wheel automatically turns the roller to keep supplying the wheel with ink.

The swiveled frame 144 supports an angle bracket 156 which carries a stud 157. A roller 158 mounted on this stud rides on the bar 34 of the scanning carriage SK. A torsion spring 159, attached at one end to the pivoted arm 145 and having its other end fixed to the plate 18, always presses against the arm to rock it forward (to the left in Fig. 6). Consequently, the roller 158 is always held in pressure contact with the carriage bar 34 and the marking wheel 155 is kept away from the sheet mounted on the drum 22.

The carriage bar 34 is formed at the top with a notch or recess 160 which stands a short distance from the roller 158 when the scanning carriage SK is in normal position (Fig. 1). As the carriage is moved forward a short distance, say about one inch, the roller 158 is pushed into the notch 160 by the torsion spring 159 so that the arm 158 swings downward to press the wheel 155 briefly against the sheet on the rotating drum. The continued forward movement of the carriage bar 34 cams the roller 158 out of the recess 160 and the wheel 155 is forced away from the paper back to normal position.

Figure 5:
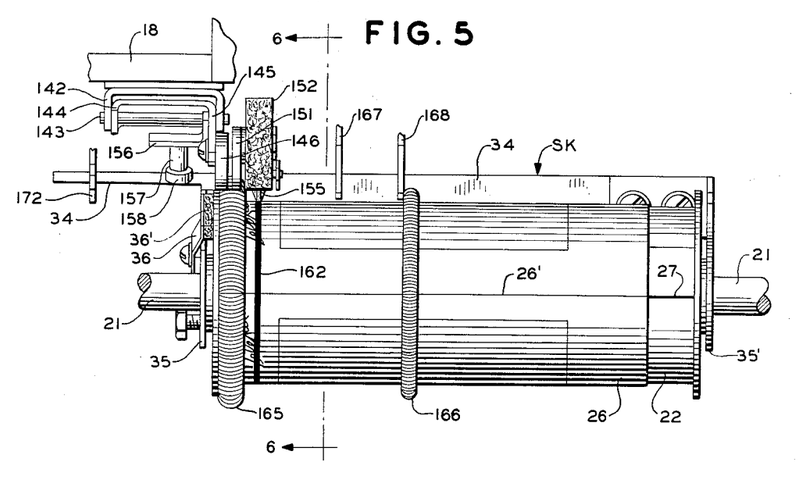
Fig. 5 shows in plan a portion of the machine including the drum and the message marking device.
Figure 6:
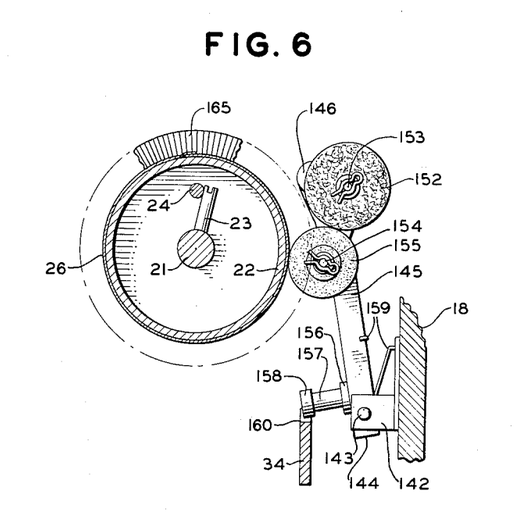
Fig. 6 is a section on line 6—6 of Fig. 5.

Because the carriage slides along slowly and the drum rotates rapidly, the brief contact of the marking wheel 155 on the paper is sufficient to make a distinctive ring 162 on the sheet (Fig. 5). When the scanned sheet is removed and flattened out, this ring appears as a straight line (made usually of a bright color like red) near the top of the telegram sheet, and constitutes recorded evidence that the message has been transmitted. By making the recess 160 longer, the inking time of the wheel 155 is prolonged to mark a correspondingly wider band.

The sheet 26, whether for transmission or recording, must be properly mounted on the drum 22 so as to be held firmly in smooth condition during the sliding movement of the rapidly rotating drum. For this purpose we employ a pair of spring garters 165 and 166. While such garters have been previously used on scanning drums, the present arrangement and operation of the two garters present a feature not found in prior facsimile machines.

To wrap a sheet around the drum, the attendant moves the garter 166 to the right end of the drum, as indicated by the dotted outline 166' in Fig. 2. This leaves the drum clear for mounting the sheet, which is wrapped around the drum and pushed to the left under the spring garter 165 against the left flange of the drum. The garter 165 holds the left edge of the sheet pressed against the drum, and then the other garter 166 is rolled over the sheet to the position shown in Figs. 1 and 2.

Referring to the plan view in Fig. 1, it will be seen that two angle brackets 167 and 168 are attached horizontally to the back wall 18 in properly spaced relation. The bracket 167 confines the garter 165 against the left drum flange and the other bracket 168 stops the garter 166 a short distance to the right of the scanning plane 170 (whether the optical scanner or the recording stylus is used).

As the drum 22 slides to the left, the garter 165 moves along with it to hold the left edge of the scanned sheet firmly to the drum, but the garter 166 is held back by the stop 168 and grips the moving sheet at the same distance from the scanning plane 170. In consequence, the sheet on the drum represents a continuous tight and smooth surface to the scanning element during the full travel of the drum. It will, of course, be understood that the spring garter 166 rolls easily over the paper without releasing its tension.

There is a third stop bracket 172, also attached to the vertical plate 18, so shaped as to extend into the path of the garter 165, as can be seen in Figs. 1 and 4. However, the bracket 172 is so located that the garter 165 does not strike it until most of the message has been scanned or recorded. In Fig. 1 we may assume that the dotted line 170' represents the position of the scanning plane 170 on the sheet when the garter 165 is in position 165' and strikes the stop 172.

The continued leftward movement of the drum leaves the garter 165 stationary as it rolls over the moving sheet to keep the scanned portion from unwrapping or becoming loose under the centrifugal effect of the high rotary speed of the drum. The final position of the drum is indicated in Fig. 1 by the dotted end flanges 173 and by that time the garter 166 has cleared the blank 26. When the released drum returns to normal position, the garter 165 is carried along until it strikes the stop 167 which holds it against the left flange of the drum. The attendant can now pull the sheet from under the garter 165 and take it off the drum.

In the machine as completed for commercial use, there is a removable casing of attractive design which encloses everything except the drum 22 and the switch buttons 100, 101, 102. When the scanning starts, the drum moves slowly leftward into the casing. In this respect our transceiver resembles in a general way the machine of Wise Patent No. 2,315,361, issued March 20, 1943. However, the present machine involves important structural improvements which give a more reliable and serviceable transceiver for use in modern facsimile telegraph circuits.

Let it be understood that the specific apparatus herein disclosed represents but one practical embodiment of our invention, and the novel features expressed in the appended claims are not confined to the details here shown and described by way of explanation.

We claim as our invention:

1. In a facsimile machine, a rotary shaft operable at scanning speed, a sheet holding drum slidably mounted on said shaft, a driving connection between said shaft and drum for rotating the drum regardless of its sliding movement, a slidable carriage having a horizontal base which carries means for feeding the drum along the shaft as the carriage slides in either direction, a rack fixed on said carriage base, a motor driven pinion permanently in mesh with said rack for sliding the carriage forward along the shaft, and spring means for automatically returning the carriage and drum to initial position when the power is taken off said opinion, which is freely rotatable backward by said rack to let the carriage return.

2. In a facsimile machine, a rotary shaft operable at scanning speed, a sheet holding drum slidably mounted on said shaft, a driving connection between said shaft and drum for rotating the drum regardless of its sliding movement, a slidable carriage having a pair of arms supported freely on said shaft and embracing the drum at its ends, whereby said arms push the drum along the shaft as the carriage slides in either direction, a rack fixed on said carriage, a motor driven pinion permanently in mesh with said rack for sliding the carriage forward along the shaft, and spring means for automatically returning the carriage and drum to initial position when the power is taken off said pinion, which is freely rotatable backward by said rack to let the carriage return.

3. In a facsimile machine, a rotary shaft, a scanning drum slidably mounted on said shaft and connected thereto for rotation, a slidable carriage for feeding said drum along the shaft, a rack on said carriage, a synchronous motor of the low-speed clock type mounted with its shaft vertical, a pinion on said vertical shaft permanently in mesh with said rack to move the carriage and drum forward, and spring means for returning the carriage and drum to initial position upon the deenergizing of said motor, which allows the pinion to rotate backward during the return of the carriage.

4. In a facsimile machine, a rotary shaft operable at scanning speed, a sheet holding drum slidably mounted on said shaft, a driving connection between said shaft and drum for rotating the drum regardless of its sliding movement, a slidable carriage comprising a substantially U-shaped frame with a horizontal base bar and a pair of upwardly extending arms freely suspended from said shaft, said arms embracing the drum at its ends so as to push it along the shaft when the carriage slides in either direction, a rack secured to said base bar, a motor mounted adjacent to said carriage with its driving shaft vertical, a pinion fixed on said last named shaft and arranged in permanent mesh with said rack for operating the carriage in a forward direction when said motor is energized, means cooperating with said pinion for guiding the carriage in a straight path parallel to the drum shaft, and spring means for automatically returning the carriage and drum to initial position when the motor is deenergized, said pinion being freely rotatable backward by said rack to let the carriage return.

5. In a facsimile machine, a rotary drum for supporting a sheet in scanning position, a slidable carriage for axially feeding said drum during its rotation, a marking device associated with said drum, and means operable solely by said carriage in a predetermined position to actuate said device into marking contact with the scanned sheet.

6. In a facsimile machine, a rotary drum for supporting a sheet in scanning position, a slidable carriage for axially feeding said drum during its rotation, a movable arm associated with said drum, a marker carried by said arm and normally held away from the drum, and cooperative means on said carriage and arm for automatically causing said arm to actuate the marker into marking contact with the scanned sheet when the carriage is in a predetermined position and to retract said arm away from said drum when the carriage leaves said predetermined position.

7. In a facsimile machine, a rotary drum for supporting a sheet in scanning position, a slidable carriage for axially feeding said drum during its rotation, a spring urged pivoted arm associated with said drum, a marker carried by said arm, an extension on said arm arranged to engage said carriage which normally holds the arm back to keep the marker away from the drum, and means on the carriage to release said spring urged arm at a predetermined position of said carriage during the scanning operation, whereby said arm carries the marker into marking contact with the scanned sheet.

8. In a facsimile machine, stylus operating mechanism comprising a motor whose shaft is geared to low speed, a stylus support fixed on said shaft and actuated thereby to scanning position, and means for stalling the motor in energized condition to hold the stylus support in its operative position.

9. In a facsimile machine having means for supporting a sheet to be scanned, stylus operating mechanism comprising a motor whose shaft operates at low speed, a stylus supporting arm mounted on said shaft and actuated thereby to carry the stylus into scanning contact with said sheet, and means for stopping said arm in scanning position while said motor remains energized, whereupon the motor stalls and the torque exerted on its shaft holds the arm against said stop means.

10. In a facsimile machine having means for supporting a sheet in scanning position, stylus operating mechanism comprising a rotary shaft, a pivotal support connected to said shaft and carrying a stylus, spring means for normally holding said stylus support inoperative, a motor for rotating said shaft at low speed to move the stylus support into scanning position, and means for automatically stalling the energized motor at a predetermined moment, whereupon the torque exerted on said shaft holds the stylus in scanning contact with the sheet, said spring means automatically returning the stylus support to normal position upon the deenergizing of said motor.

11. In a facsimile machine having means for supporting a sheet in scanning position, stylus operating mechanism comprising a motor whose shaft is geared to low speed, an arm rigidly mounted on said shaft, a second arm toggle jointed to said first arm and carrying a stylus which is resiliently supported in relation to the first arm, whereby the slow movement of said toggle arms by the motor carries the stylus into gradual pressure contact with the sheet, and means for automatically stalling the energized motor when the stylus reaches scanning position, whereupon the torque exerted on the motor shaft holds the stylus in pressure contact with the sheet.

12. In a facsimile machine, a stylus support comprising a flat metal strip pivotally mounted at one end to swing edgewise in its own plane, the other end of said strip being formed with three integral prongs which are resilient, the central prong extending beyond the two side prongs which are formed with aligned offsets, and a stylus shaped from a single piece of wire which has a straight front portion passing through said offsets and held in pressure contact with the central prong, the rear end of said wire being hooked over the central prong to take up the axial thrust imposed on said straight portion.

13. In a facsimile transceiver, transmitting equipment and recording equipment, a source of power for energizing said equipments, a sending switch for energizing only the transmitting equipment, a receiving switch for energizing only the recording equipment, a locking member actuated by either switch to hold the same closed and simultaneously release the other switch from closed position, and a stop button for actuating said member to release either switch from closed position and thereby disconnect the power from the machine.

14. In a facsimile transceiver, transmitting equipment and recording equipment, a slidable scanning carriage common to both equipments, a source of power for energizing said equipments, a sending switch for energizing only the transmitting equipment, a receiving switch for energizing only the recording equipment, a locking member actuated by either switch to hold the same closed, said member automatically releasing either switch from closed position when the other switch is closed, so that only one switch can be in operative position at one time, and cooperative means on said member and said carriage whereby the carriage at the end of its forward travel moves said member to releasing position and thereby turns the power off the machine.

15. A facsimile transceiver provided with transmitting equipment including an optical scanning device, receiving equipment including a recording device, a rotary drum for supporting a sheet in scanning position for either device, a first motor for rotating said drum, a second motor for producing axial displacement of the drum relatively to either one of said scanning devices, a third motor for moving said recording device to operative position, a source of power for the transceiver, a sending switch for energizing said first and second motors and said transmitting equipment to the exclusion of the recording equipment and said third motor, a receiving switch for energizing said recording equipment and all three motors to the exclusion of the transmitting equipment, each switch being constructed to remain in operated position, and means whereby the closing of either switch automatically opens the other switch, so that only one equipment can be in operation at a time.

16. In a facsimile transceiver, a one-piece casting having a horizontal base and a vertical back wall, a horizontal platform extending rearward from said wall, a rotary scanning drum operatively supported on said base in front of said wall, optical scanning mechanism mounted on said platform, a light chopper motor for said optical mechanism secured to the rear face of said vertical wall beneath said platform, and stylus recording mechanism mounted on said casting base in front of said wall, whereby said casting forms a unitary support for said drum and both of said mechanisms.

17. A facsimile transceiver having a chassis, a casting of generally rectangular shape mounted on said chassis lengthwise thereof, said casting comprising a horizontal base, a vertical back wall and a pair of upright sides, a shaft journaled in said sides, a motor attached to said back wall for operating said shaft, a drum mounted on said shaft for rotation thereby, said drum being axially movable on the shaft, a slidable carriage for feeding said drum along the shaft, a second motor secured to the underside of said casting base for operating said carriage, a third motor attached to said base which has a recess for positioning said third motor with its shaft horizontal, a stylus support carried by said third motor and operated thereby into recording position, and optical scanning mechanism mounted on the back wall of said casting in operative relation to a supported sheet.

References Cited in the file of this patent

UNITED STATES PATENTS

| | | |
|---|---|---|
| 2,255,868 | Wise | Sept. 15, 1941 |
| 2,301,024 | D'Humy | Nov. 3, 1942 |
| 2,365,741 | Wise et al. | Dec. 26, 1944 |
| 2,375,820 | Ridings et al. | May 15, 1945 |
| 2,394,649 | Young | Feb. 12, 1946 |
| 2,511,837 | D'Humy et al. | June 20, 1950 |
| 2,575,546 | Boyajean | Nov. 30, 1951 |